United States Patent
Cui et al.

(10) Patent No.: US 9,384,284 B2
(45) Date of Patent: Jul. 5, 2016

(54) VALUE-ADDED USAGE OF PROCESS-ORIENTED EXTENSION FIELDS IN BUSINESS MASHUPS

(71) Applicant: SAP AG, Walldorf (DE)

(72) Inventors: Weiyi Cui, Shanghai (CN); Xiao Xu, Wujiang (CN); Jinghui Li, Shanghai (CN); Haojie Zhang, Shanghai (CN); Jun Wu, Shanghai (CN)

(73) Assignee: SAP SE, Walldorf (DE)

( * ) Notice: Subject to any disclaimer, the term of this patent is extended or adjusted under 35 U.S.C. 154(b) by 425 days.

(21) Appl. No.: 13/669,293

(22) Filed: Nov. 5, 2012

(65) Prior Publication Data
US 2014/0129917 A1    May 8, 2014

(51) Int. Cl.
*G06F 17/20* (2006.01)
*G06F 17/30* (2006.01)
*G06F 9/54* (2006.01)

(52) U.S. Cl.
CPC .......... *G06F 17/30867* (2013.01); *G06F 9/541* (2013.01)

(58) Field of Classification Search
CPC .... G06F 17/2247; G06F 17/24; G06F 17/211
See application file for complete search history.

(56) References Cited

U.S. PATENT DOCUMENTS

| | | | |
|---|---|---|---|
| 8,001,463 B2 * | 8/2011 | Burns | G06F 17/30873 715/234 |
| 8,584,082 B2 * | 11/2013 | Baird | G06F 8/34 715/762 |

* cited by examiner

*Primary Examiner* — Stephen Hong
*Assistant Examiner* — Shahid Khan
(74) *Attorney, Agent, or Firm* — Schwegman Lundberg & Woessner, P.A.

(57) ABSTRACT

A method for value-added usage of process-oriented extension fields in business mashups may include generating, using at least one processor, a mashup component with an unbound parameter; receiving input identifying the creation of an extension field, the extension field tied to data stored in a database; binding the unbound parameter of the mashup component to the extension field; presenting an application interface, the application interface including the extension field; receiving a request to load the mashup component; and in response to receiving the request, passing the data tied to the extension field as an input parameter to the mashup component.

19 Claims, 7 Drawing Sheets

LIST OF FIELDS

[ ADD ]  [ EDIT ]  [ REMOVE ]

ADD NEW EXTENSION FIELD     [ ] X

| | |
|---|---|
| BUSINESS CONTACT | CONTACT – GENERAL INFORMATION | — 202
| FIELD TYPE | TEXT ▽ | — 204
| DEFAULT VALUE | | — 206
| FIELD VALUE | SOCIAL NETWORK ID | — 208
| TOOLTIP | SOCIAL NETWORK ID | — 210

[ SAVE ]  [ CANCEL ]

VALUE-ADDED USAGE OF PROCESS-ORIENTED EXTENSION FIELDS IN BUSINESS MASHUPS

TECHNICAL FIELD

This patent document pertains generally to linking data sources including, but not by way of limitation, a system and method for value-added usage of process-oriented extension fields is business mashups.

BACKGROUND

A business service provider (BSP) may provide infrastructure to store and manage business data for its enterprise clients instead of the client investing in such infrastructure. A business application may be provided to the client from the business service provider that displays fields associated with the business data. For example, the business application may present the name of a contact in a contact field.

Additionally, the client may allow users (e.g., employees of the client) or company partners to create a "mashup" component that incorporates data from multiple sources. For example, business data such as client addresses could be joined with snapping data from a third-party service and shown in a single interface hosted on the business service provider. In some instances the binding between the mashup and business data is created by the BSP. This may lead to a lack of customizability, if for example, a client wants to use a piece of business data in a mashup that the BSP has not bound.

BRIEF DESCRIPTION OF DRAWINGS

Some embodiments are illustrated by way of example, and not limitation in the figures of the accompanying drawings in which:

FIG. 2 is a user interface for defining an extension field, according to various embodiments.

DETAILED DESCRIPTION

Figure 1:
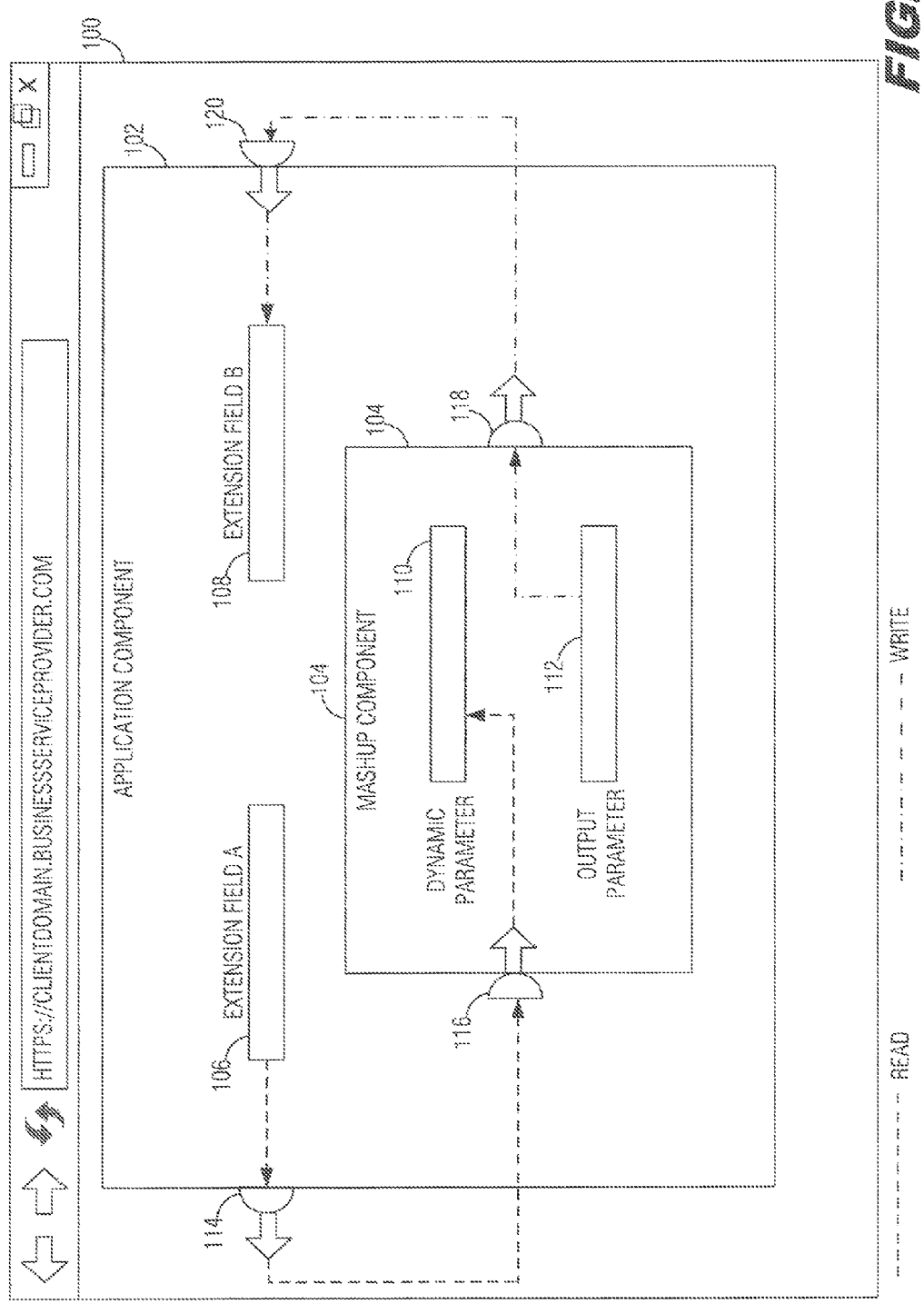
FIG. 1 is an application interface, according to an example embodiment.

The following detailed description includes references to the accompanying drawings, which form a part of the detailed description. The drawings show, by way of illustration, specific embodiments in which the disclosure may be practiced. These embodiments, which are also referred to herein as "examples," are illustrated in enough detail to enable those skilled in the art to practice the disclosed inventive subject matter. The embodiments may be combined, other embodiments may be utilized, or structural, logical, and electrical changes may be made without departing from the scope of the present disclosure. The following detailed description is, therefore, not to be taken in a limiting sense, and the scope of the present disclosure is defined by the appended claims and their equivalents.

An enterprise (e.g., a company of one or more individuals) may store and access business information in a number of different ways. For example, an enterprise might store information about production, sales, human resources, etc., in one or more database structures. Collectively this information may be considered business object data or context information. In an embodiment, instead of the enterprise purchasing and maintaining the backend components (e.g., web servers, hard disk drives, etc.), the enterprise may contract with a business service provider (BSP) (e.g., SAP®). The business service provider may have multiple enterprise clients and may maintain business object data for each client as "internal" data. For demonstrative purposes throughout this disclosure, a fictional "ACME Corp," will be used as an enterprise/company that is a client of the BSP.

Additionally, the BSP may allow a company to access and edit the company's information using a web-based interface referred to as a business application. For example, one or more fields may be presented in the business application that are tied back to the underlying database structure. The interface(s) may be transmitted to a user and rendered on a client device (e.g., personal computer, mobile phone) for interacting with the business object data. A user may be an employee of the enterprise or another entity that authenticates with the business service provider before the electronic interfaces are transmitted to the client device.

The electronic interfaces may be implemented using a variety of technologies. For example, an HTML interface may include an application programmed using a web framework (e.g., MICROSOFT® SILVERLIGHT® software framework, ADOBE® FLASH® software framework, JAVA® software framework). Thus, in an example, a web browser executed on a client device may transmit an HTTP request for a website, hosted at the business service provider, and receive an HTML webpage with the application in response.

The application, may be rendered within the browser of the client creating one or more user input and output elements on a display of the client device. Using an input device of the client device, a user may interact with the user input elements (e.g., selecting, highlighting, and entering text). The application/webpage may then update according to the interaction, in various examples, data representing the interaction may be transmitted to the business service provider or other network location for processing before the application is updated.

The interface may provide tools to create "mashups" by the company. A mashup may access one or more external services (e.g., mapping service or social network) within the context of the business application and may also write the data received (e.g., parameters) from the external service to the business application. For example, a mashup may read information in fields of the business application screen and place the information in an "out-port" of the business application. The information in the out-port may be sent to an "in-port" of the mashup and then used as input parameters to a call (e.g., HTTP GET) to an external service. When the external service responds, parameters included in the response may be written back, to an out-port of the mashup and routed to an in-port of the business application to fill-in another field of the business application. The fields on the business application screen may be tied to information stored in the internal database structure hosted by the BSP for the company such that for example, a contact entry may be updated based on information received from the external service.

The tools for creating mashups may come with preset bindings that bind parameters in the mashups to base classes of fields on the application screen (e.g., via the imports and out-ports). Base classes fields may include, for example, a name and address of a contact. However, a problem arises in that each company may want classes of fields that are not available in the base classes or not bound to a mashup parameter. For example, one company may want a contact entry in a database to include a field for a social network user ID.

Because there is conceivably a limitless supply of types of data a company may wish to bind, the BSP may not be able to define and hind all the in-ports, out-port, and fields. Thus, the company may be limited in the bindings available (e.g., base classes) made from parameters in the mashups to the underlying business content data of the company, or the company may have to wait until the BSP updates its business application screen to incorporate the new field. Described herein are various embodiments that facilitate the creation of extension fields to help alleviate same of the problems discussed above.

FIG. 1 is an application interface, according to an example embodiment. FIG. 1 includes webpage interface 100 that includes application component 102, mashup component 104, extension field A 106, extension field B 108, dynamic parameter 110, and output parameter 112. Application component 102 also includes application in-port 120, application out-port 114, mashup in-port 116, and mashup out-port 118.

While not illustrated, webpage interface 100 (e.g., business application) may be transmitted from a server of a BSP and received at a network-connected device. The server may be implemented on one physical device or multiple devices. The devices may be located in a single location or may be distributed across multiple locations. Additionally, mashup component 104 may communicate with an external service (e.g., web mapping, web searching) via a network.

In various embodiments, the server, network-connected device, and external service may be connected via one or more networks. Example networks may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The networks may include a single local area network (LAN) or wide-area network (WAN), or combinations of LAN's or WAN's, such as the Internet.

In an embodiment, data may be exchanged between the server, network connected device, and external device via one or more data exchange interfaces. For example, a data exchange interface may be implemented as one or more Application Programming Interface (API). A data exchange interface may also include one or more function calls for the retrieval or submission of data (e.g., REST, request/response model) from the external service.

Users may internet with the elements in the application component 102 via a network connected user device. Examples of a user device include, but are not limited to, laptops, tablets, cell phones, smart phones, feature phones, personal computers, network access cards, and other devices capable of communicating an network.

In various embodiments, webpage interface 100 may be presented to a user of a company by entering a domain, address into a web browser executing on a user device. Upon entering the domain address into the web browser, the user device may transmit a request (e.g., an HTTP GET request) over a network to a server of the BSP. In response to the requests the server may transmit one or more webpage files back to the user device that are associated with the company.

The webpage(s) may be formatted according to a markup language such as HyperText Markup Language (HTML). Then, the web browser on the user device may interpret the markup language and render webpage(s) on a display device of the user device. A BSP may have different webpages for each client. The webpages may include a business application component tailored to the client and facilitate the creation and use of mashup components.

FIG. 1 illustrates an overview of how data may flow during read and write operations between application component 102 and mashup component 104 after a user has created the extensions fields and bindings.

In various embodiments, the data in an extension field read operation flows from an extension field and into a dynamic parameter of a mashup. For example, data may be entered into extension field A 106 by a user. When mashup component 104 is loaded (e.g., a user requests the mashup be displayed), the data in extension field A 106 may be placed in application out-port 114 and routed to mashup in-port 116 where it is used as dynamic parameter 110.

Dynamic parameter 110 may be a parameter that is used in a POST call to an external service. For example, consider an API call to a search engine. The API may request a search string as a parameter represented by 'q' in the following statement:

http:/www.examplesearch.com/results.html?q= samplesearch

The search parameter may be the data that comes from extension field A 106. In various embodiments, extension field A 106 has a default value. In various embodiments, data in extension field A 106 may be retrieved from a business object of a company stored in a database.

In various embodiments, the data flow in an extension field write operations starts at an output parameter of a mashup component and flows to an extension field of an application component. For example, during execution of a mashup component, parameterized data may be received using an HTTP GET call. For example, continuing with the search engine example, a set of results of the search may be transmitted back to mashup component 104 with the title of a result being one parameter. The title of one of the results may be used as the data for output parameter 112. This data may be placed in mashup out-port 118 and routed to application in-port 120 which in turn displays the data in extension field B 108. In an embodiment, the data that is displayed in extension field B 108 is also stored as a business object in a database.

Figure 3:
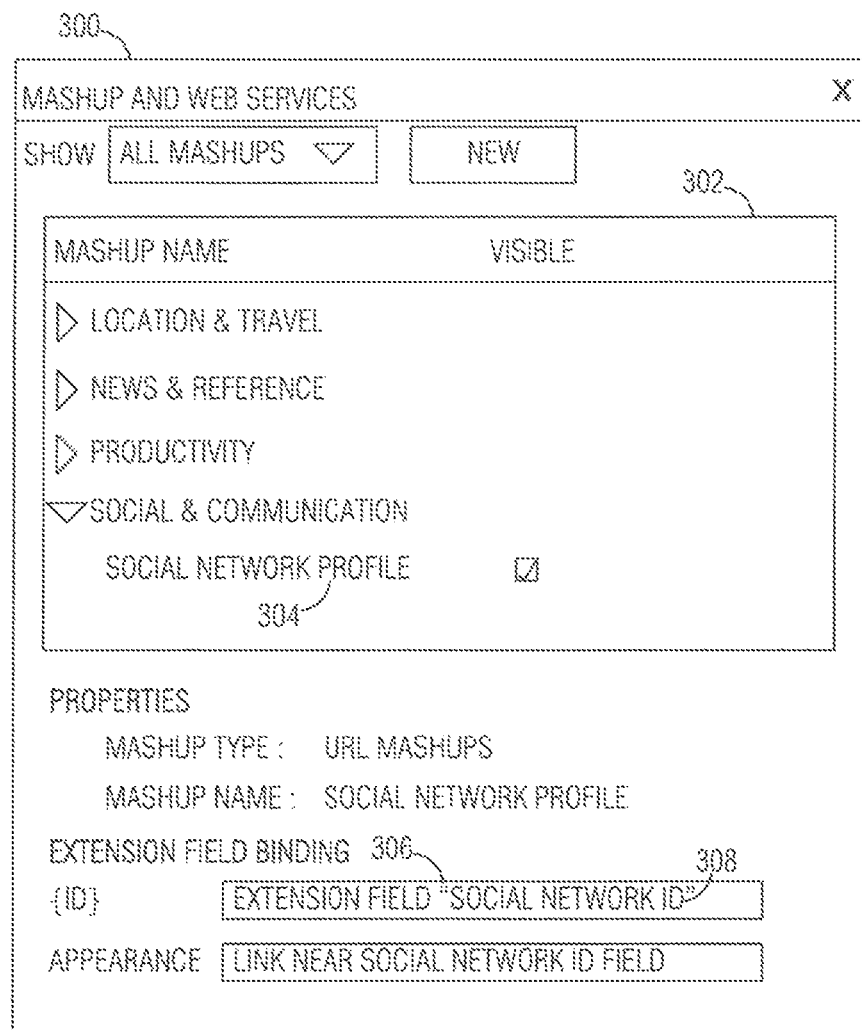
FIG. 3 illustrates a mashup configuration user interface, according to various embodiments.
Figure 4:
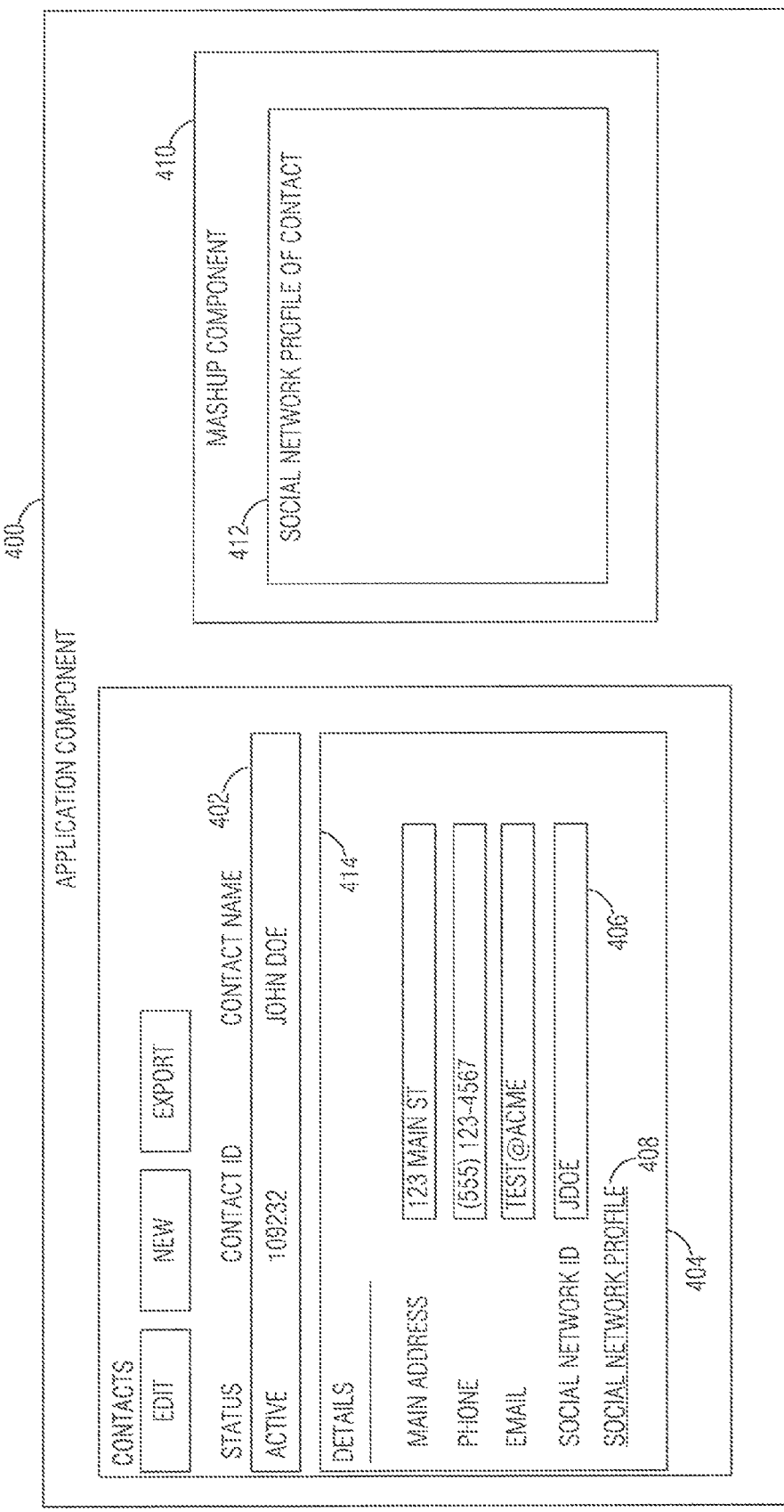
FIG. 4 illustrates a web interface according to various embodiments.

FIGS. 2-4 illustrate a series of user interfaces for setting up a social networking extension field, according to various examples.

FIG. 2 is a user interface for defining an extension field, according to various examples. User interface 200 includes business contact data 202, field type data 204, default value data 206, field value 208 and tooltip data 210. User interface 200 may be presented (e.g., transmitted) to a user using an application interface such as application component 102.

As illustrated, there may be various options for an extension field that is created by a user. For example, a type of contact information may be specified for the field. In FIG. 2, the business contact is for general information. Extension fields may also have different types. For example, field type data 204 is illustrated as a "text" typo, but other types may also be used, including, but not limited to, decimal numbers, e-mail addresses, date, time, indicator, and web addresses. The extension field may also have a default value that may be shown in an application screen. The extension field in FIG. 2 has no default value specified; therefore, when the field is displayed, the field may be blank.

In an embodiment, field value 208 specifies the identifier by which the extension field may be referenced in a mashup component as further explained with reference to FIG. 3. Additionally, field value 208 may relate to the field of a contact business object. For example, "Social Network ID" may refer to a field of a contact in the general information portion of a contact as stored in a BSP database. Tooltip data 210 may be displayed when a cursor hovers over the extension field in an application screen.

FIG. 3 illustrates a mashup configuration user interface 300, according to various embodiments. As with FIG. 2, interface 300 may be displayed in an application component such as application component 102 of FIG. 1. FIG. 3 illustrates a list of mashups 302 that are available for configuration grouped according to various categories. In an example, social networking profile mashup 304 is selected. Therefore, the properties and extension field bindings relate to the social networking profile mashup 304 in this example.

In an embodiment, {ID} binding 306 is defined as "Extension Field 'Social Network ID'" 308. Thus, the ID parameter of the social networking profile is bound to the "Social Network ID" extension field that was defined in FIG. 2, in an example. Additionally, FIG. 3 indicates that the appearance of the mashup binding is a link near the extension field.

FIG. 4 illustrates a web interface, according to various embodiments. Web Interface includes application component 400, mashup component 410, contact overview 402, contact details 404, social network ID 406, social network link 408, and social network profile 412.

In various embodiments, FIG. 4 illustrates an example contact editor that relates to the extension field defined in FIG. 2 and mashup configured in FIG. 3. As illustrated, John Doe is a contact that may be stored as a business object in a database maintained by a BSP on behalf of a user of the web interface. As discussed with respect to FIG. 2, a company may have a field for the social network ID of its contacts. Thus, a user may have filled in data for social network ID 406 for John Doe as JDOE. In other words, social network ID is not only a field of the business object, but also an extension field as defined in FIG. 2.

A user may click on social network link 408 to display mashup component 410 that includes social network profile 412 as configured in FIG. 3. In an embodiment, JDOE is passed to the mashup component 410 to be used as a dynamic parameter and used in an HTTP POST call a social networking service to retrieve the social networking profile of John Doe (e.g., http://www.examplesite.com/users/JDOE).

Figure 5:
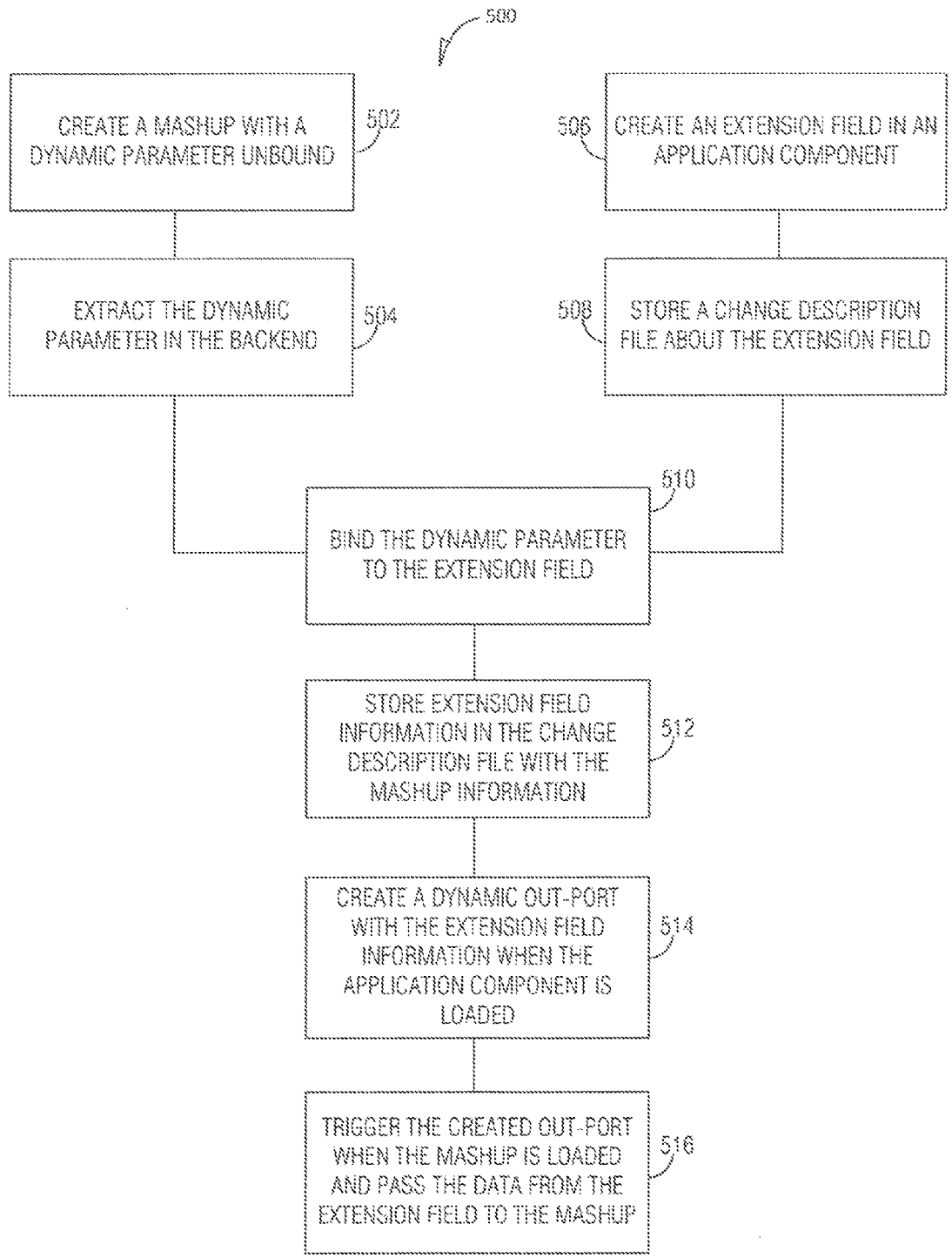
FIG. 5 is a flow chart illustrating a method to read an extension field, recording to an example embodiment.

FIG. 5 is a flow chart illustrating a method to read an extension field, according to an example embodiment. In various embodiments, the method 500 may be performed by any of the modules, logic, or components described herein. For narrative purposes, method 500 may be performed by a server or servers of the BSP. Further, a user (e.g., an employee of a company that has contracted with the BSP) may interact with user interfaces provided by the BSP and transmit input from a user device to the server or servers.

At block 502, in an embodiment, a mashup component is generated with a dynamic parameter unbound. As discussed previously, a dynamic parameter may be used in a HTTP POST call to an external service and thus may also be considered an input parameter with respect to a mashup. In an embodiment, unbound means that a dynamic parameter has not been tied to an extension field of an application component. This may be in contrast to base fields that have already been bound according to the BSP. Thus, parameters tied to base fields may not be considered dynamic according to various embodiments.

The mashup component may be generated through the use of one or more user interfaces supplied by the BSP. For example, the user may interact with the user interfaces to define a mashup according to the preferences (e.g., layout, which external services to call, etc.) of the user. The preferences and associated data may be transmitted back to the BSP. The BSP may then generate the mashup component according to these preferences and data. In an embodiment, generating includes storing a mashup definition file at the BSP. The mashup definition file may include the layout of the mashup and the preference as defined by the user. In various embodiments, the mashup definition file is stored as a structured data file such as XML.

In an embodiment, at block 504, the dynamic parameter may be extracted in the backend. In various embodiments, backend refers to the servers operated by the BSP. Extraction may include, for example, storing and retrieving data that identifies the dynamic parameter in the mashup definition file for later use in binding.

In an embodiment, at block 506, an extension field to be displayed in an application component (e.g., business application) is created. For example, user may use an interface such as that presented in FIG. 2 to define an extension field. The extension field may be tied to a piece of data in a business object such as a contact's social network ID that is stored in a database of the BSP. Data associated with the crated extension field (e.g., the data filled in an interface of FIG. 2) may be transmitted back to the BSP for creation of the extension field.

In an embodiment, at block 508, a change description file about the extension field is stored by the BSP. For example, application component such as that displayed in FIG. 1 may be changed according to the created mashups and extension fields of user. In order to accurately represent the new fields and matchups, a change description file may be stored that indicates the added/removed components of the application component. Thus, with respect to block 508, the change description file may indicate that the created extension field is to be presented (e.g., transmitted for display in a browser of a user) in the application component the next time the application component is loaded/transmitted to a user. The change description file may include the preferences for layout and name of the extension field as defined by the user.

In an embodiment at block 510, the dynamic parameter is bound to the created extension field. For example, a binding user interface tool such as that presented in FIG. 3 may be used by a user to bind the created extension field to the dynamic parameter of the mashup generated in block 502. In an embodiment, the dynamic parameter and extension field are both displayed in the binding user interface tool.

In an embodiment, at block 512, extension field information is stored in the change description file along with the mashup component information. For example, the extension field information may represent the binding as defined at block 510. Thus, the change description file may include data identifying the created extension field and the binding of the extension field to the mashup component as defined by user.

In an embodiment, at block 514 a dynamic out-port is created with the extension field information when the application component is loaded. For example, consider a user that wants to use the newly created extension field. Upon loading an application component in which the created extension field is presented to the user, an out-put may be dynamically created for the created extension field. This may be contrast to base fields in which the out-port may already be created prior to the application component being loaded. In an embodiment, the extension field may be loaded with data from a database that is associated with the extension field. For example, a social network ID of a contact may be presented (e.g., transmitted for display) in the extension field.

In an embodiment, an out-port refers to a data interface exposed by an application UI component (e.g., extension field). When an out-port is used (e.g., triggered or fired) data is passed to an in-port of another UI component or mashup. Similarly, an in-port is a data interface that accepts data from an out-port. In various embodiments, imports are predefined for a mashup according to type (e.g., text, etc.).

In various embodiments, at block 516, the created out-port is triggered when the mashup component bound to the extension field is loaded (e.g., a user requests to use the mashup). Thus, data tied to the extension port (e.g., data from a business object stored in a database) may be loaded into the out-port of the extension field when the mashup is loaded. Then, the data may be passed to an in-port of the mashup component. In turn, the in-port of the mashup component may be associated with the dynamic parameter defined in block 502. Accordingly, the mashup component may use the data from the in-port as an input parameter to an API call to an external service associated with the mashup as defined in block 502.

Figure 6:
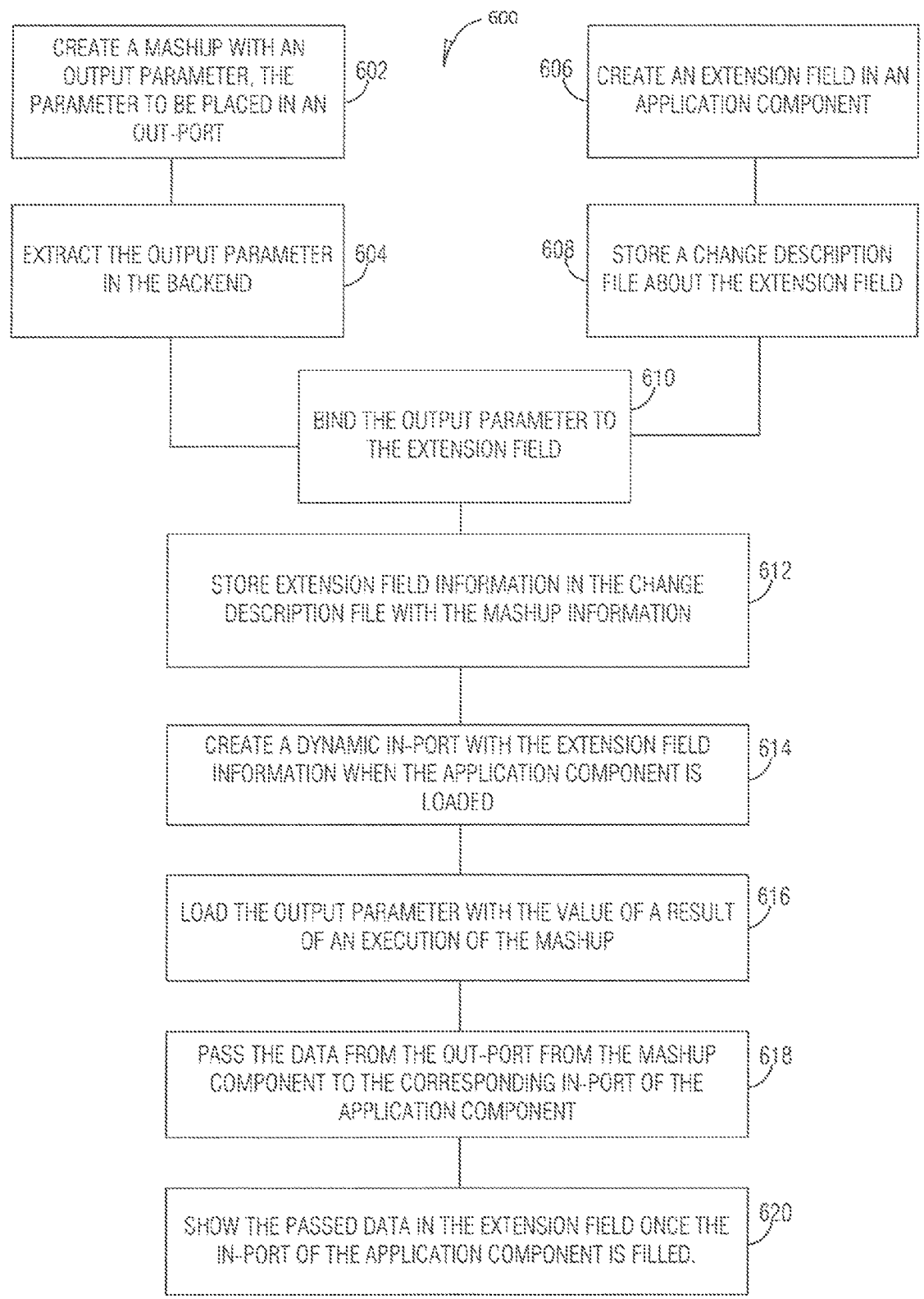
FIG. 6 is a flow chart illustrating a method to write to an extension field, according to an example embodiment.

FIG. 6 is a flow chart illustrating a method to write to an extension field, according to an example embodiment. In various embodiments, the method 600 may be performed by any of the modules, logic, or components described herein. For narrative purposes, method 600 may be performed by a server or servers of the BSP. Further, a user (e.g., an employee of a company that has contracted with the BSP) may interact with user interfaces provided by the BSP and transmit input from a user device to the server or servers.

At block 602, in an embodiment, a mashup component is generated with an output parameter. As discussed previously, an output parameter may be part of the result of an API call to an external service. The mashup component may be generated through the use of one or more user interfaces supplied by the BSP. For example, the user may interact with the user interfaces to define a mashup according to the preferences (e.g., layout, which external services to call, etc.) of the user. The preferences and associated data may be transmitted back to the BSP. The BSP may then generate the mashup component according to these preferences and data. In an embodiment, generating includes storing a mashup definition file at the BSP. The mashup definition file may include the layout of the mashup and the preference as defined by the user. In various embodiments, the mashup definition file is stored as a structured data file such as XML.

In an embodiment at block 604, the output parameter may be extracted in the backend. In various embodiments, backend refers to the servers operated by the BSP. Extraction may include, for example, storing and retrieving data that identifies the output parameter in the mashup definition file for later use in binding.

In an embodiment, at block 606, an extension field to be displayed in an application component (e.g., business application) is created. For example, a user may use an interface such as that presented in FIG. 2 to define an extension field. The extension field may be tied to a piece of data in a business object such as a contact's social network ID that is stored in a database of the BSP. Data associated with the created extension field (e.g., the data billed in an interface of FIG. 2) may be transmitted back to the BSP for creation of the extension field.

In an embodiment, at block 608, a change description file about the extension field is stored by the BSP. For example, an application component such as that displayed. In FIG. 1 may be changed according to the created mashups and extension fields of a user. In order to accurately represent the new fields and matchups, a change description file may be stored that indicates the added/removed components of the application component. Thus, with respect to block 608, the change description file may indicate that the created extension field is to be presented (e.g., transmitted for display in a browser of a user) in the application component the next time the application component is loaded/transmitted to a user. The change description file may include the preferences for layout and name of the extension field as defined by the user.

In an embodiment, at block 610, the output parameter is bound to the created extension field. For example, a binding user interface tool such as that presented in FIG. 3 may be used by a user to bind the created extension field to the output parameter of the mashup generated in block 602. In an embodiment, the output parameter and extension field are both displayed in the binding user interface tool.

In an embodiment, at block 612, extension field information is stored in the change description file along with the mashup component information. For example, the extension field information may represent the binding as defined at block 610. Thus, the change description file may include data identifying the created extension field and the binding of the extension field to the mashup component as defined by user.

In an embodiment, at block 614 a dynamic in-port is created with the extension field information when the application component is loaded. For example, consider a user that wants to use the newly created extension field. Upon loading an application component in which the created extension field is presented to the user, an in-port may be dynamically created for the created extension field. This may be in contrast to base fields in which the in-port may already be created prior to the application component being loaded.

In an embodiment, an out-port refers to a data interface exposed by application UI component (e.g., extension field). When an out-port is used (e.g., triggered or fired) data is passed to an in-port of another UI component or mashup. Similarly, an in-port is a data interface that accepts data from an out-port. In various embodiments, imports are predefined for a mashup according to type (e.g., text, etc.).

In various embodiments, at block 616, the output parameter is loaded with the value of a result of an execution of a mashup. For example, the mashup may communicate with an external service (e.g., social networking service) to retrieve the social networking ID of a contact. The social networking ID may be received as a parameter and loaded in the output parameter defined in block 602.

In various embodiments, at block 618, the data in the out-put parameter may be passed to the dynamically created in-port of the application component, for example an out-port of the mashup component may be loaded with the value of the result and passed to the in-port.

In various embodiments, at block 620, the value from the executed mashup (e.g., the social networking ID) may be shown in the extension field. For example, the value as loaded in the in-port may be presented in the extension field. In an embodiment, a contact entry in a database may be updated with the social networking ID as presented in the extension field.

Modules, Components and Logic

Certain embodiments are described herein as including logic or a number of modules, component, engines or mechanisms (collectively referred to as modules). Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g. as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations, it will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time, for example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, hut deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Example Machine Architecture and Machine-Readable Medium

Figure 7:
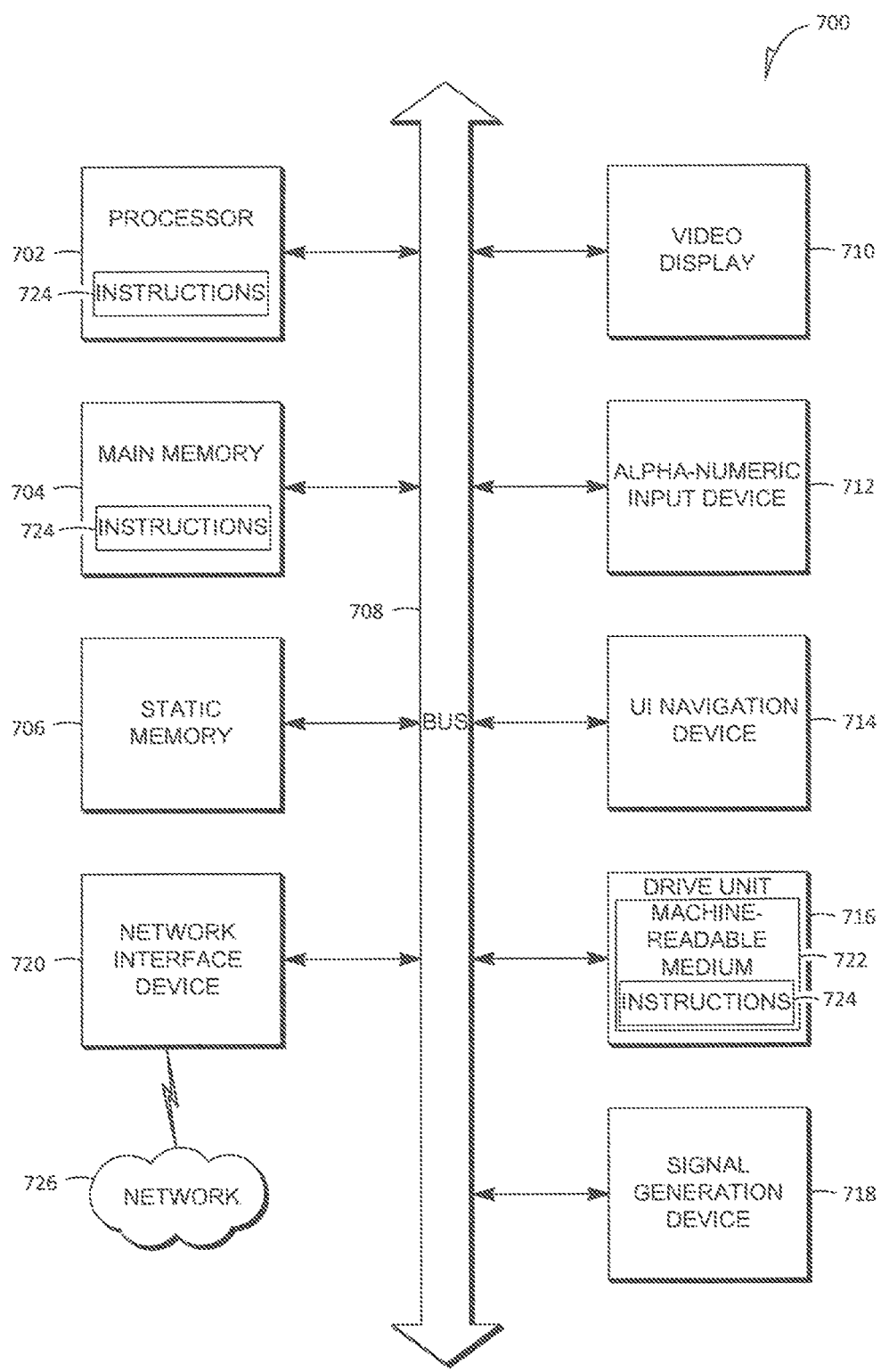
FIG. 7 is a diagrammatic representation of a machine its the example form of a computer system within which a set instructions tor causing the machine to perform any one or more of the methodologies discussed herein may be executed.

FIG. 7 is a block diagram of machine in the example form of a computer system 700 within which instructions 724 for causing the machine to perform any one or more of the methodologies discussed herein may be executed. In alternative embodiments, the machine operates as a standalone device or may be connected (e.g., networked) to other machines. In a networked deployment the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (CPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

Machine-Readable Medium

The disk drive unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g. a centralized or distributed database, and/or associated caches and servers) that store the one or more instructions 724 or data structures. The term "machine-readable medium" shall also be taken to include any tangible medium that is capable of storing, encoding or carrying instructions for execution by the machine and that cause the machine to perform any one or more of the methodologies of the embodiments of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
generating, using at least one processor, a mashup component with an unbound dynamic parameter, the unbound dynamic parameter being an I/O field unassociated with a data entry field of an application interface;
receiving input identifying creation of an extension field; the extension field being a data entry field defined by at least a field type, a field value by which the extension field is referenced, and a user interface element by which the extension field is displayed in an application interface, the extension field tied to data stored in an internal database;
binding the unbound dynamic parameter of the mashup component to the extension field, the binding creating an association between the mashup component and the extension field;
presenting the application interface, the application interface including the extension field, the data extension field including at least a portion of the data tied to the extension field, the extension field and the data tied to the extension field being presented as the user interface element within the application interface;
in response to presenting the application interface, generating a dynamic out-port for the extension field;
receiving a request to load the mashup component; and
in response to receiving the request:
loading the dynamic out-port for the extension field with the data tied to the extension field;
passing the data in the loaded dynamic out-port of the extension field to the mashup component as an input parameter to the mashup component; and
using the input parameter in a call to an external service remote from the internal database and in communication with the mashup via a network.

2. A method comprising:
generating, using at least one processor, a mashup component with an unbound parameter, the unbound parameter being an I/O field unassociated with a data entry field of an application interface;
receiving input identifying creation of a first extension field and a second, extension field, the first extension field being a data entry field defined by at least a field type, a field value by which the first extension field is referenced, and a first user interface element by which the first extension field is displayed in the application interface, the second extension field defined by at least a field type, a field value by which the second extension field is referenced, and a second user interface element by which the second extension field is displayed in the application interface, the first extension field tied to data stored in a database;
binding the unbound parameter of the mashup component to the first extension field, the binding creating an association between the mashup component and the first extension field;
presenting the application interface, the application interface including the first extension field and the second extension field, the first extension field and the second extension field presented as the first user interface element and the second user interface element within the application interface;
receiving a request to load the mashup component;
in response to receiving the request, passing the data tied to the first extension field as an input parameter to the mashup component;
passing data received by the mashup component, in response to the input parameter, to the second extension field; and
presenting the data received by the mashup component in the second extension field.

3. The method of claim 2, further comprising:
storing a change description file, the change description file including binding data identifying that the unbound parameter is bound to the first extension field.

4. The method of claim 3, further comprising:
in response to presenting the application interface, generating an out-port for the first extension field using the binding data stored in the change description file.

5. The method of claim 4, further comprising:
loading the out-port of the first extension field with the data tied to the first extension field upon receiving the request to load the mashup component; and
wherein passing the data tied to the first extension field includes passing the data loaded in the out-port of the first extension field as the input parameter to the mashup component.

6. The method of claim 2, further comprising:
loading the data tied to the first extension field from the database; and
presenting the data tied to the first extension field in the first extension field.

7. The method of claim 2, wherein binding the unbound parameter of the mashup component to the first extension field includes:
presenting a binding user interface tool; and
receiving input via the binding user interface tool that identifies that the unbound parameter is to be bound to the first extension field.

8. The method of claim 2, wherein the mashup component combines data from an external service, remote from the database and in communication with the mashup via a network, and data stored in the database and wherein the input parameter is used in an API call to the external service.

9. A method comprising:
generating, using at least one processor, a mashup component with an output parameter and an out-port related to the output parameter;
receiving input identifying creation of an extension field, the extension field defined by at least a field type by which the extension field is referenced and a user interface element by which the extension field is displayed in an application interface, the extension field tied to data stored in a database;
binding the output parameter of the mashup component to the extension field, the binding creating an association between the mashup component and the extension field;
receiving a request to load an application associated with the data stored in the database tied to the extension field; and
in response to receiving the request:
generating an in-port related to the extension field;
presenting the application interface, the application interface including the extension field and the mashup component, the extension field presented as the user interface element within the application interface;
loading parameter data from the mashup component into the out-port;
passing the parameter data tied to the generated in-port related to the extension field; and
updating the data stored in the database, to which the extension field is tied, with the parameter data from the mashup component.

10. The method of claim 9, further comprising:
storing a change description file, the change description file including binding data identifying that the output parameter is bound to the extension field.

11. The method of claim 10, further comprising:
updating the application interface according to the change description file.

12. The method of claim 9, wherein the mashup component retrieves the parameter data from an external service remote from the database and in communication with the mashup via a network.

13. The method of claim 9, further comprising:
presenting the parameter data in the extension field.

14. A non-transitory computer-readable medium comprising instructions, which when executed by at least one processor, configure the at least one processor to perform a series of operations, the operations comprising:
generating, using the at least one processor, a mashup component with an unbound parameter, the unbound parameter being an I/O field unassociated with a data entry field of an application interface;
receiving input identifying creation of a first extension field and a second extension field, the first extension field defined by at least a field type by which the first extension field is referenced and a first user interface element by which the first extension field is displayed in the application interface, the second extension field being a data entry field defined by at least a field type, a field value by which the second extension field is referenced, and a second user interface element by which the second extension field is displayed in the application interface, the first extension field tied to data stored in a database;
binding the unbound parameter of the mashup component to the first extension field, the binding creating an association between the mashup component and the first extension field;
presenting the application interface, the application interface including the first extension field and the second extension field, the first extension field and the second extension field presented as the first user interface element and the second user interface element within the application interface;
receiving a request to load the mashup component;
in response to receiving the request, passing the data tied to the first extension field as an input parameter to the mashup component;
passing data received by the mashup component, in response to the input parameter, to the second extension field; and
presenting the data received by the mashup component in the second extension field.

15. The non-transitory computer-readable medium of claim 14, wherein the operations further comprise:
storing a change description file, the change description file including binding data identifying that the unbound parameter is bound to the first extension field.

16. The non-transitory computer-readable medium of claim 15, further comprising:
in response to presenting the application interface, generating an out-port for the first extension field using the binding data stored in the change description file.

17. The non-transitory computer-readable medium of claim 16, further comprising:
loading the out-port of the first extension field with the data tied to the first extension field upon receiving the request to load the mashup component; and
wherein passing the data tied to the first extension field includes passing the data loaded in the out-port as the input parameter.

18. A non-transitory computer-readable medium comprising instructions, which when executed by at least one processor, configure the at least one processor to perform a series of operations, the operations comprising:
generating, using the at least one processor, a mashup component with an output parameter and an out-port related to the output parameter;
receiving input identifying creation of an extension field, the extension field defined by at least a field type by which the extension field is referenced and a user interface element by which the extension field is displayed in an application interface, the extension field tied to data stored in a database;

binding the output parameter of the mashup component to the extension field, the binding creating an association between the mashup component and the extension field;

receiving a request to load an application associated with the data stored in the database and tied to the extension field; and in response to receiving the request:
  generating an in-port related to the extension field;
  presenting application interface, the application interface including the extension field and the mashup component, the extension field resented as the user interface element within the application interface;
  loading parameter data from the mashup component into the out-port;
  passing the parameter data tied to the generated in-port related to the extension field; and
  updating the data stored in the database, to which the extension field is tied, with the parameter data from the mashup component.

19. The non-transitory computer-readable medium of claim 18, wherein the operations further comprise:
storing a change description file, the change description file including binding data identifying that the output parameter is hound to the extension field.

* * * * *